United States Patent [19]

Shibuya et al.

[11] Patent Number: 4,870,458
[45] Date of Patent: Sep. 26, 1989

[54] DISPLAY AND INPUT COMBINATION PANEL

[75] Inventors: Kunihiro Shibuya, Yokohama; Tuyoshi Todome, Setagaya, both of Japan

[73] Assignee: Kabushiki Kaisha Toshiba, Kawasaki, Japan

[21] Appl. No.: 42,025

[22] Filed: Apr. 24, 1987

[30] Foreign Application Priority Data

May 31, 1986 [JP] Japan ................................ 61-126643

[51] Int. Cl.⁴ ........................ G03G 15/00; G09G 3/02
[52] U.S. Cl. .................................... 355/200; 355/218; 340/712
[58] Field of Search .............. 355/3 SH, 14 SH, 14 R, 355/14 C, 75, 200, 209, 218; 340/706–708, 711–712; 364/188; 350/333, 339 R, 339 F, 339 D

[56] References Cited

U.S. PATENT DOCUMENTS

| | | | |
|---|---|---|---|
| 4,332,464 | 6/1982 | Bartulis et al. | 355/14 C |
| 4,527,862 | 7/1985 | Arakawa | 350/339 R X |
| 4,639,881 | 1/1987 | Zingher | 340/712 X |
| 4,679,909 | 7/1987 | Hamada et al. | 350/333 |
| 4,679,927 | 7/1987 | Sogo et al. | 355/14 R X |
| 4,704,004 | 11/1987 | Nosker | 350/339 R Y |

FOREIGN PATENT DOCUMENTS

| | | |
|---|---|---|
| 59-32035 | 2/1984 | Japan ................. 340/712 |
| 60-97344 | 5/1985 | Japan . |
| 61-67025 | 4/1986 | Japan . |

OTHER PUBLICATIONS

Georg Schlegel KG, Frontplatten Druckknopfkasten Fusstaster, 2200/78.
R. H. Harris, J. A. Williams, "Liquid Crystal Display and Touch Panel Keyboard Input", IBM Technical Disclosure Bulletin, vol. 24, No. 4, Sep. 1981, pp. 1888 to 1890.

Primary Examiner—Arthur T. Grimley
Assistant Examiner—J. Pendegrass
Attorney, Agent, or Firm—Foley & Lardner, Schwartz, Jeffery, Schwaab, Mack, Blumenthal & Evans

[57] ABSTRACT

To reduce the areas of a display panel and an input panel of a copying machine, for instance, the two panels are combined at the same place. The combination panel comprises a liquid crystal display panel for displaying various data thereon in response to a display signal indicative of x- and y-coordinates, and a transparent electrode-matrix touch panel superposed upon the display panel to enter operation data related to the displayed data when a user touches the surface thereof at the position under which the data is being displayed to generate an operation signal indicated by the same x- and y-coordinates. A Fresnel lens is placed on the display unit or under the touch panel to deflect light toward the user. Further, a sensor is disposed in the touch panel so that when an original is sandwiched between the two panels, the touch panel is usable to determine any desired rectangular image area to be trimmed or masked, while shifting the display area to the side thereof.

11 Claims, 9 Drawing Sheets

DISPLAY AND INPUT COMBINATION PANEL

BACKGROUND OF THE INVENTION

The present invention relates to a display and input combination panel for displaying various operation information and for entering operation instructions related to the displayed information, and more specifically to a panel unit provided with both display panel and input panel arranged on the same area to reduce areas occupied by a conventional display panel and input panel. This combination panel is the most suitably applicable to a copying machine.

In a copying machine, an original can be copied as follows: an original is placed onto an original mounting base arranged on the top surface of the machine; an original cover member (platen cover) pivotally supported by hinges on the original mounting base is placed onto the placed original; and then the operator depresses any desired keys arranged in a keyboard of an input panel disposed outside the platen cover to copy the original under any desired conditions (the number of copies, paper size, magnification, density, the designation of copied area, etc.)

In the ordinary copying machines, however, a broad area of the machine upper surface is occupied by a display panel having light emitting diodes or liquid crystal displays and an input panel having a number of keys. The display panel serves to display various machine conditions (e.g. no paper, paper jamming, no toner, etc.) or various selectable information (e.g. paper size, magnification or minification, the number of copies, density, etc.) determined by the user through the keys.

Therefore, as copying functions provided for the copying machine increase, the area occupied by the display panel and the input panel increases on the top surface of the copying machine, thus obstructing the miniaturization of the machine and the legibility of displayed characters. In addition, since the operation of the input panel is complicated, there exists a problem in that the operability of the machine is degraded, in particular, in a copying machine by which a copied area can be selected in trimming or masking operation.

SUMMARY OF THE INVENTION

With these problems in mind, therefore, it is an object of the present invention to provide a display and input combination panel which can improve the legibility of the display panel and the manipulability of the input panel, without increasing the size or dimensions of the input panel or of the machine such as copying machine or image reader.

To achieve the above-mentioned and other objects, the invention includes an apparatus for displaying and entering operation instructions and image information related to an original. This apparatus includes a means for displaying operation information at predetermined coordinates, the displaying means having a surface for supporting the original thereon, and means disposed on said displaying means in tandem for entering operation instructions in accordance with the operation information displayed on said displaying means. Accordingly, the information entered is related to the original.

BRIEF DESCRIPTION OF THE DRAWINGS

The features and advantages of the display and input combination panel according to the present invention over the prior art input panel will be more clearly appreciated from the following description of the preferred embodiment of the present invention taken in conjunction with the accompanying drawings in which like reference numerals designate the same or similar elements or sections throughout the figures thereof and in which.

BRIEF DESCRIPTION OF THE PREFERRED EMBODIMENTS

Figure 1A:
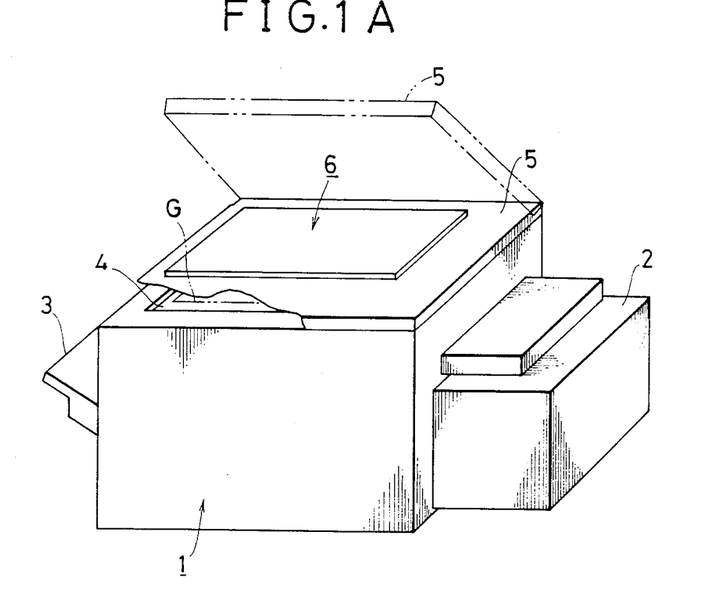
FIG. 1A is a perspective view showing a copying machine to which a first embodiment of the display and input combination panel according to the present invention is applied.
Figure 1B:
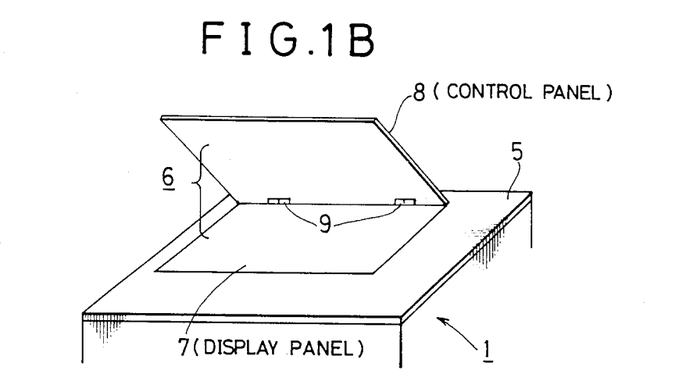
FIG. 1B is a similar perspective view separately showing a display panel and an input panel of the present invention attached to an platen cover of the copying machine shown in FIG. 1A.

With reference to FIG. 1A a copying machine 1 includes a paper tray section 2 for accommodating paper serving as an information recording medium and a copied paper tray section 3 for receiving copied paper. An image on an original G mounted on an original mounting base 4 provided on the upper surface of the machine is copied onto a copying paper by means of an optical system, a developing apparatus, a transferring apparatus, a paper separator, a fixing apparatus, etc. (all not shown) all incorporated within the copying machine.

On the original mounting base 4 formed on top of the copying machine 1, a platen cover 5 for holding and pressing an original G mounted on the base 4 is pivotably supported by hinges so as to be openable upward as shown dot-dot-dashed lines in FIG. 1A. In this platen cover 5, a display and input combination panel 6 of the present invention is incorporated spreading over roughly the whole surface of the platen cover 5.

Figure 2:
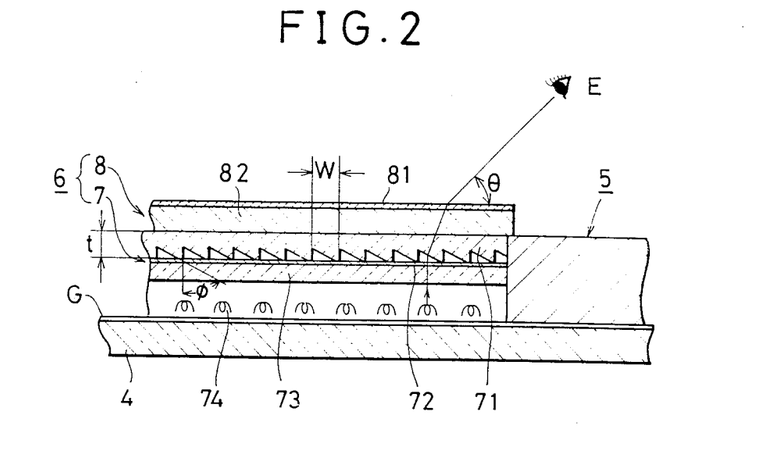
FIG. 2 is an enlarged partial cross-sectional view showing the combination panel of the present invention.

This combination panel 6 of rectangular shape has as shown in FIG. 2, an optical display panel 7 put in the platen cover 5 and an input panel 8 superposed upon the optical display panel 7. This input panel 8 is supported on the platen cover 5 via two hinges 9 so as to be openable upward away from the display panel 7. That is, the platen cover 5 is openable upward away from original mounting base 4, while input panel 8 is further openable upward away from the platen cover 5.

As shown in FIG. 2, the optical display panel 7 has a Fresnel lens (deflection lens) 71, a color filter 72, a liquid crystal board 73 and the back light 74 in order from the top surface side of the platen cover 5. The light emitted from the back light 74 is passed through the liquid crystal board 73 (on which various machine conditions and various machine instructions are displayed) and the color filter 72 to obtain a colored display image, and then deflected through the Fresnel lens 71 toward operator's eyes E.

As shown in FIG. 2, the Fresnel lens 71 serves to deflect the light L vertically emitted from the back light 74 in a frontward direction with an appropriate deflection angle $\theta$ (e.g. 30 to 60 degrees). The typical dimensions of the Fresnel lens 71 are as follows, the thickness t is 3 mm; the lens interval W is 0.2 mm; the sawtooth angle $\phi$ is 51.1 to 76.2 degrees.

Figure 3A:
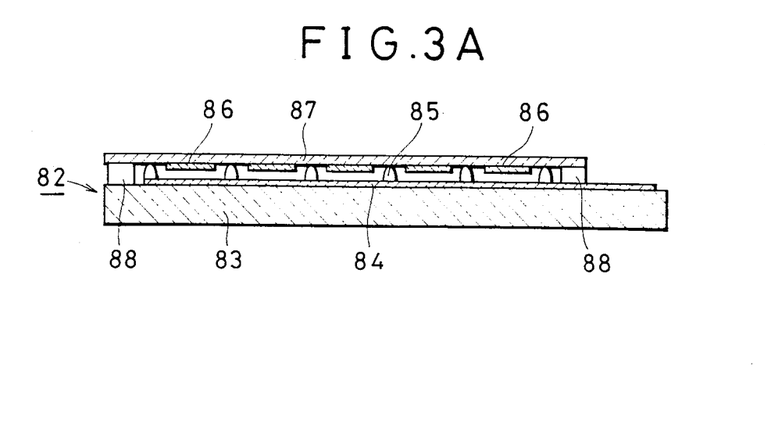
FIG. 3A is an enlarged partial cross-sectional view showing the input panel of the present invention.

On the other hand, as shown in FIG. 2, the input panel 8 is a transparent touch panel 82 having a top surface 81 on which non-glare treatment is effected to form a reflection prevention film. As depicted in FIG. 3, this touch panel 82 has a transparent glass board 83, a first transparent electrode (indium-tin oxide film) 84 arranged in band shape extending in the X-direction, a plurality of spacers 85 arranged on the first transparent electrode 84, and a transparent film 87 on which a plurality of transparent electrodes (switch keys) 86 are arranged in band shape extending in the y-direction, as x-y coordinate reading keys. Each of these electrodes 86 is arranged within a space enclosed by the spaces 85. Further, a sealing member 88 is disposed to seal the periphery of the touch panel 82.

It is preferable to determine the key pitch as short as possible (e.g. 1.3 mm).

The above non-glare treatment 81 effected on the surface of the transparent touch panel 81 serves to prevent light from being reflected from the surface of the touch panel 81 to the eyes of an operator, that is, to reduce the eye strain of the operator. This non-glare treatment is multilayered coating (referred to as multicoat) of zirconia, alumina or $SiO_2$.

When this transparent touch panel 82 is superposed upon the optical display panel 7, various displays related to the copying machine appearing on the liquid crystal board 73 are colored into a color image through the color filter 72 and seen by an operator through the Fresnel lens 71 and the touch panel 82 without glaring.

Figure 3B:
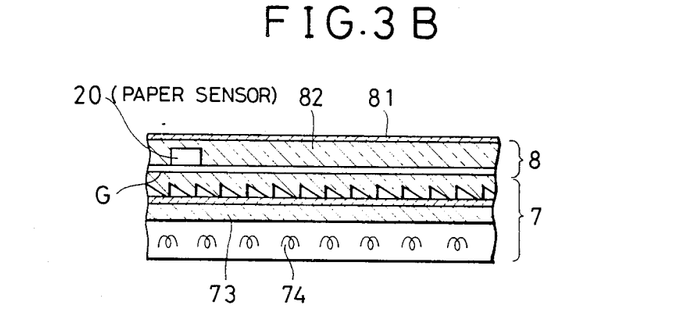
FIG. 3B is an enlarged partial cross-sectional view similar to FIG. 2, in which a paper sensor is incorporated in the input panel of the present invention.

Further, as shown in FIG. 3B, a paper sensor 20 for sensing the presence or absence of an original G sandwiched between the display panel 7 and the input panel 8 is disposed within the touch panel 82 of the input panel 8 and near one of original setting guide marks 21 (shown in FIG. 8 and described later in further detail). When no original paper exists between the two panels 7 and 8, since the sensor 20 is activated by the light of the back light 74, a paper absence signal is outputted from the sensor 20. However, if an original paper is sandwiched between the two, since the light from the back light 74 is shut off, the sensor 20 is deactivated and a paper presence signal is outputted from the sensor 20. In response to this paper absence or presence signal, it is possible to automatically determine whether the copying machine is set to the ordinary copy mode (the absence of paper) or to the copy area designation mode (e.g. masking mode or trimming mode) (the presence of paper), as described later in further detail.

In the above embodiment, the ordinary optical copying machine has been explained. However, the display and input combination panel according to the present invention is also applicable to a digital copying machine provided with a digital scanner for reading image information on an original in digital fashion by scanning a light beam.

Figure 4:
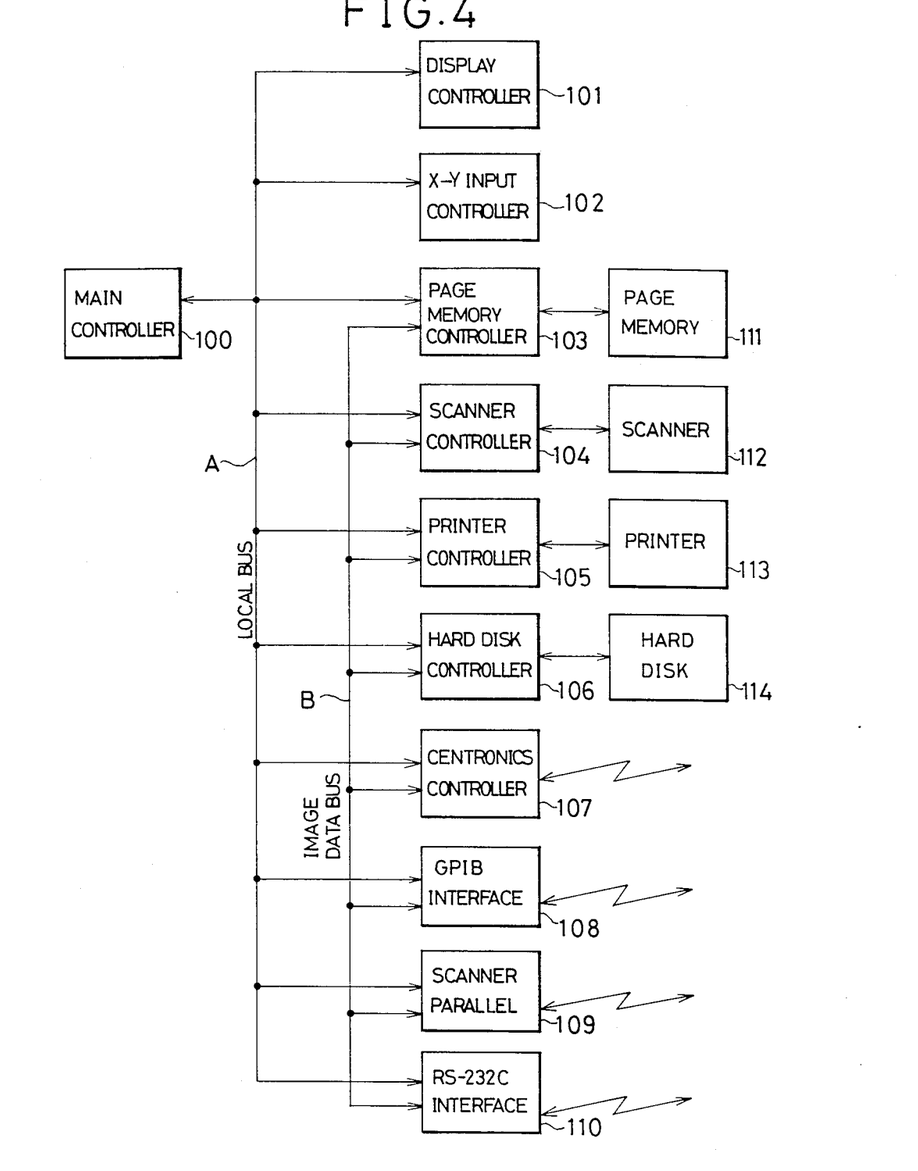
FIG. 4 is a schematic block diagram of a digital copying machine or an image reader to which the display and input combination panel according to the present invention is applied.

FIG. 4 shows a schematic block diagram of a digital copying machine. In this drawing, various controllers such as a display controller 101, an x-y coordinate input controller 102, a page memory controller 103, a scanner controller 104, a printer controller 105, a hard disc controller 106, etc. are connected to a main controller 100 via a CPU local bus A. Further, various interfaces such as a Centronics (trademark) interface 107, a GPIB (communication cable standard) interface 108, a scanner parallel interface 109, a RS-232C interface 110, etc. are connected to the main controller 100 via the local bus A.

Further, the page memory controller 103, the scanner controller 104, the printer controller 105, the hard disc controller 106, the Centronics controller 107, the GPIB interface 108, the scanner parallel interface 109 and the RS-232C interface 110 are all connected to each other via an image data bus B. The page memory controller 103 is connected to a page memory 111; the scanner controller 104 is connected to a scanner 112; the printer controller 105 is connected to a printer 113; and the hard disc controller 106 is connected to a hard disc 114.

Figure 5:
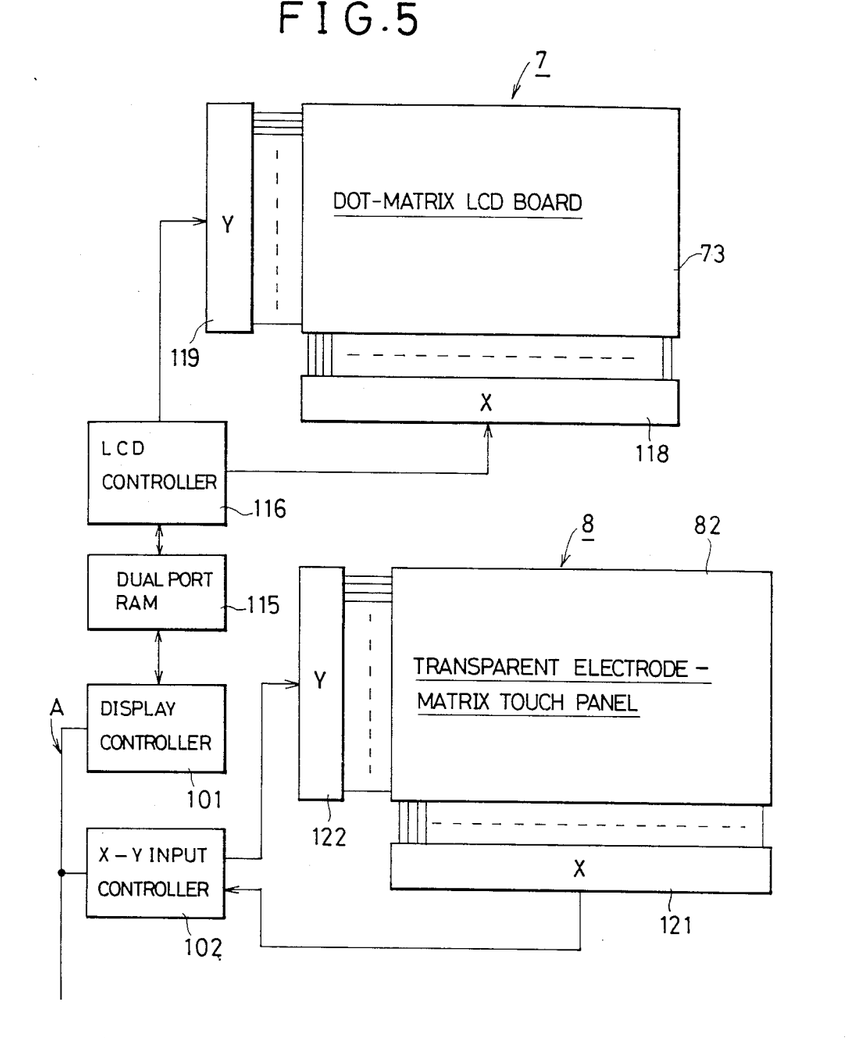
FIG. 5 is a schematic block diagram of the display and input combination panel according to the present invention.

The display and input combination panel according to the present invention is connected to the above display controller 101 and the x-y coordinate input controller 102, as shown in FIG. 5.

In FIG. 5, the optical display panel 7 includes a dot-matrix liquid crystal board 73, an x-driver 118, and a y-driver 119. The transparent input panel 8 includes a transparent electrode-matrix touch panel 82, an x driver 121 and a y driver 122. The x- and y-drivers 118 and 119 of the display panel 7 are connected to the display controller 101 via a LCD (liquid crystal display) controller 116 and a displaying dual port RAM 115; while the x- and y-drivers 121 and 122 of the transparent input panel 82 are directly connected to the x-y coordinate input controller 102.

That is, the main controller 100 (a microcomputer) controls all the units connected thereto via the CPU local bus A and the image data bus B. The display panel 7 and the transparent input panel 8 are also controlled by the main controller 100 so as to implement various copying procedures.

In this connection, the page memory 111 stores inputted digital image data corresponding to one page; the scanner 112 provided with optical or optoelectrical transducer elements outputs image data by scanning an original to read image data from an original; the printer 113 produces hard copy; the hard disc 114 stores various data; and the various interfaces 107 to 110 are connected to external devices such as communication cables, external scanners, other computers, etc. for implementing various functions.

Figure 6:
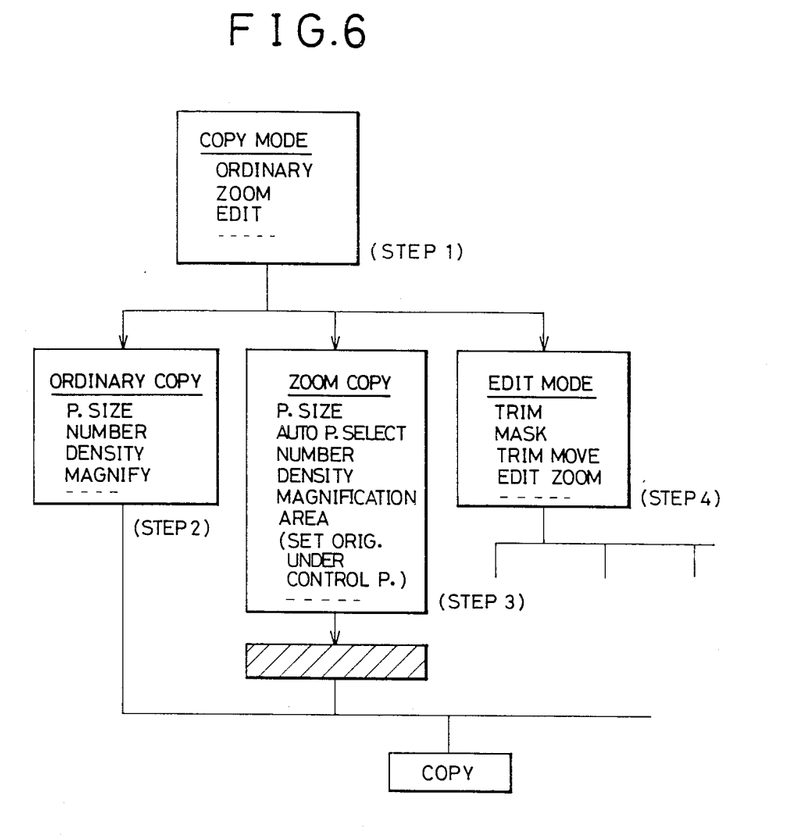
FIG. 6 is a flowchart showing an exemplary copying procedure for assistance in explaining the display and the control operations of a copying machine.
Figure 7A:
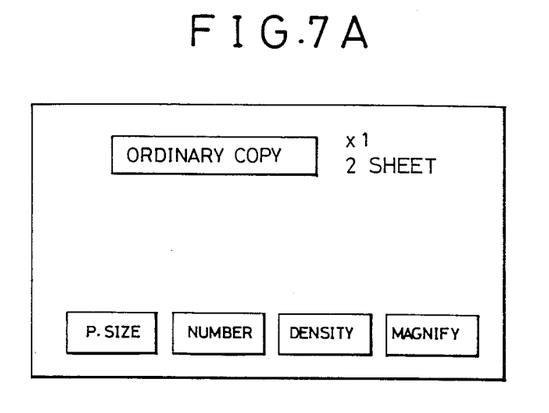
FIG. 7A is an illustration showing an example of display on the display and input combination panel according to the present invention.
Figure 7B:
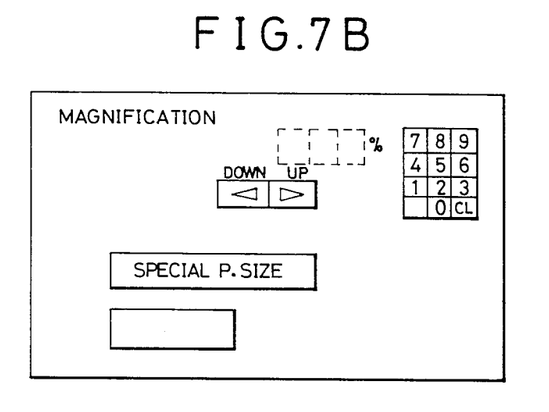
FIG. 7B is an illustration showing another example of display similar to FIG. 7A.

FIG. 6 is a flowchart showing an exemplary procedure of a copy machine, and FIGS. 7A and 7B shows some display examples.

With reference to the flowchart shown in FIG. 6, the operation of the copying machine provided with the display input combination panel according to the present invention will be described. When power is turned on and the copying machine becomes ready for copying, "COPY MODE" such as "ORDINARY copy mode", "ZOOM copy mode", "EDIT copy mode", etc. is displayed on the LCD display panel 7 in step 1. When the user selects "ORDINARY" by touching the transparent input panel 8 at a position just above the displayed position of "ORDINARY", displays of "P. SIZE", "NUMBER", "DENSITY", etc, appear on the same display panel 7 in step 2, as shown in FIG. 7A, for instance. Here, the user designates the size of copying paper, the number of copied paper, the density of copy, the magnification of copy, etc. by touching the transparent input panel 8 at each position just above each desired item.

In the same way, when the user selects "ZOOM", various items such as "PAPER SIZE", "AUTO PAPER SELECT", "NUMBER of papers", "PDENSITY", "MAGNIFICATION", "zooming AREA" are displayed to allow the user to select and determine various copying conditions in step 3. When "MAGNIFICATION" is designated, display charges to that as shown in FIG. 7B, for instance. Here, the user can determine any desired magnification by touching "UP" or "DOWN" and some digits (e.g. UP, 50%). Here, the zooming area can be determined by sandwiching an original G between the display panel 7 and the transparent input panel 8 with the original surface set the image side up and by touching two diagonal opposing points to designate a desired zooming area. Further, when the user selects "EDIT MODE" in step 4, various items such as "TRIMMING", "MASKING", "TRIMMING MOVE", "EDIT ZOOM", etc. can be selected. Here, "TRIMMING" is to copy only an area determined and "MASKING" is not to copy only an area designated.

The above-mentioned selective instructions are all displayed on the display panel 7 in blinking manner and can be seen by the user through the transparent input panel 8. Therefore, when the user softly touches the touch panel 82 of the input panel 8 at desired positions above the displays, it is possible to input any desired instructions corresponding to the user's object and related to the display information on the display panel 7 through the input panel 8.

In the above description, it should be noted that information is displayed on the display panel 7 in response to a display signal, indicative of x- and y-coordinates, obtained when the user touches the input panel 8 at a position just above the displayed information. The input panel 8 outputs an operation touch signal indicated by the same x- and y-coordinates so as to be related to the displayed information. In other words, operation data related to the displayed data can be entered into the copying machine via x-y coordinates designated on the input panel 8.

In addition, other information such as "NO PAPER", "PAPER JAMMING", "NO TONER", etc. are also displayed on the display panel 7 in blinking manner (not shown).

Figure 8:
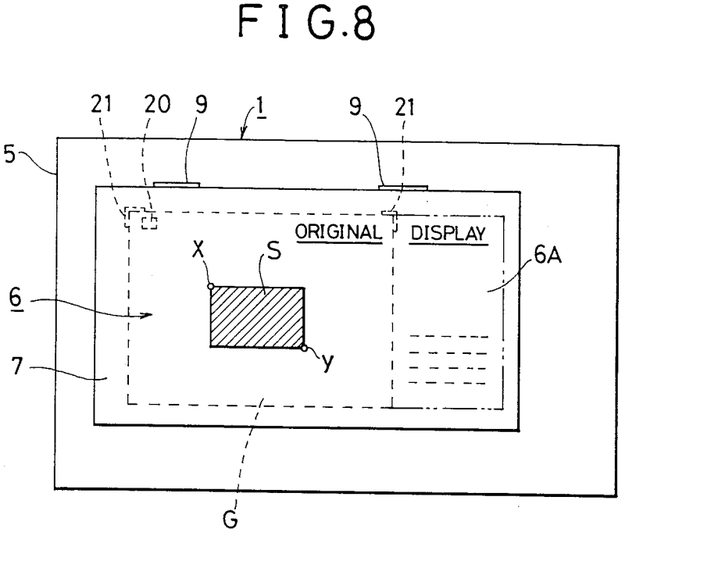
FIG. 8 is an illustration showing another example of display on the display and input combination panel according to the present invention, in which a trimming is enabled.

FIG. 8 shows the method of determining an area in EDITION mode. In the drawing, an original G is sandwiched between the optical display panel 7 and the transparent input panel 8 the image side up so that the original surface can be seen by the user through the transparent input panel 8, and the user touches two points x and y on the input panel 8 to designate a shaded area S to be trimmed or masked on the original G.

In this area designating process, the paper sensor 20 as already explained with reference to FIG. 3B can detect the presence of an original placed between the display panel 7 and the input 8, where it is previously determined that corners of the original G are always set so as to be brought into contact with original set guide marks 21. Since the sensor 20 is disposed within the touch panel 82, when an original is placed between the two 7 and 8, the light coming from the back light 74 is shut off by the original G so that the sensor 20 can detect the presence or absence of an original G. Further, when an original is set under the display panel 7 as in the ordinary copy operation, since the sensor 20 always receives the light from the back light 74 to keep outputting a signal indicative of the absence of original paper, it is possible to automatically detect whether the present mode is the ORDINARY mode or AREA DESIGNATE mode.

In FIG. 8, when an original is sandwiched between the display panel 7 and the input panel 8, the display panel 7 is covered by the original G, so that the user cannot see the display panel through the transparent input panel 8. To overcome this problem, the area of the display panel 7 is determined broader than that of the maximum original paper to be set, as shown in FIG. 8. In this case, when the sensor detects the presence of the original paper, the display panel 7 is automatically switched so that the display is shifted to the rightside 6A of the display panel 7 which is not covered by the maximum size original. Therefore, the user can select any desired instructions through the remaining display panel area 6A when designating an area to be trimmed or masked.

Figure 9:
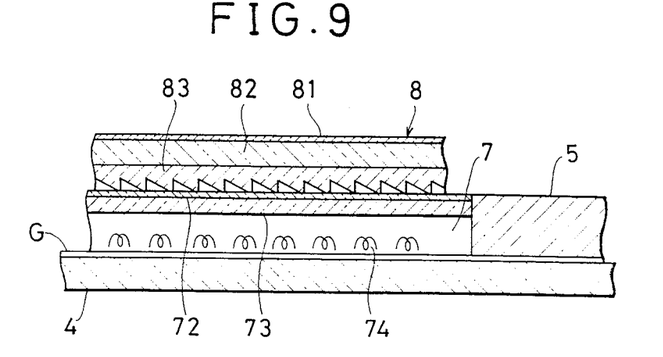
FIG. 9 is a cross-sectional view showing a second embodiment of the display and input combination panel according to the present invention.

FIG. 9 shows a modification of the display input combination panel 6 of the present invention, in which the Fresnel lens 83 is provided for the transparent input panel 8.

Figure 10A:
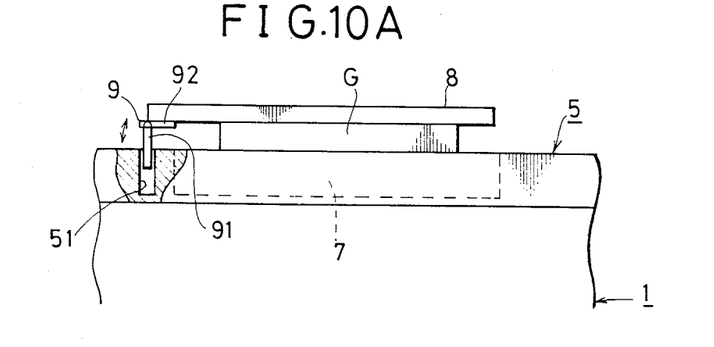
FIG. 10A is a partial cross-sectional view showing a modification of the display and input combination panel according to the present invention.
Figure 10B:
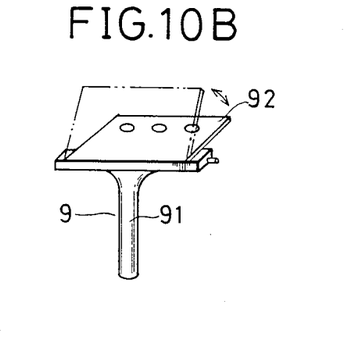
FIG. 10B is a perspective view showing only an essential portion of FIG. 10A.

Further, FIGS. 10A and 10B show another modification of the display and input combination panel 6 of the present invention, in which hinges 9 are modified so that a thick original G (e.g. book) can be sandwiched between the display panel 7 and the transparent input panel 8. A hinge shaft 91 is slidably (up and down) inserted into a guide hole 51 formed in the platen cover 5 and a hinge member 92 is pivotably attached to top of the hinge shaft 91 as shown. The input panel 8 is fixed to the hinges 92.

The display and input combination panel according to the present invention has been explained by taking the case where applied to an original holding member such as platen cover of a copying machine. However, when the combination panel is applied to an image scanner or a digital copying machine, since an image read through a scanner can be displayed on the liquid crystal display panel as it is, it is unnecessary to sandwich an original between the display panel and the input panel, that is, to construct the input panel so as to be openable relative to the display panel. Therefore, it is possible to incorporate the display panel and input panel together within the platen cover. In edition mode, an original G placed on the original mounting base is displayed on the display panel through the scanner, so that the user can determine any desired area to be trimmed or masked on the displayed original image.

Furthermore, the display and input combination panel according to the present invention can be applied to any apparatus such as computers, word processors, etc. without being limited to only copying machines.

What is claimed is:

1. A display an input combination panel, comprising:
   (a) a dot-matrix display means for displaying operation information in response to display signals indicative of -x- and -y- coordinates;
   (b) transparent electrode-matrix control means superimposed upon said dot-matrix display means for entering operation instructions related to display operation information by touching the surface thereof at positions under which operation information is being displayed to generate operation instruction signals indicated by -x- and -y- coordinates, wherein said transparent electrode-matrix control means is opened or closed relative to said dot-matrix display means by means of at least one hinge to allow an image information medium to be sandwiched between such transparent electrode-matrix control means and said dot-matrix display means; and
   a sensor disposed in said transparent electrode-matrix control means for detecting the presence of an image information medium sandwiched between said dot-matrix display means and said transparent electrode-matrix control means, whereby, when said sensor detects the presence of the medium, any desired rectangular image information area can be determined by touching the surface of said control means at two diagonally opposing points.

2. The display and input combination panel as set forth in claim 1, wherein said dot-matrix display means is restricted to a smaller area than that covered by the maximum sized image formation medium, in response to a sensor signal indicative of the presence of an image information medium sandwiched between said display means and said control means.

3. An apparatus for displaying and entering operation instructions and image information related to an original, comprising:
   (a) means for displaying operation information at predetermined coordinates, said displaying means having a surface for supporting the original thereon, the displaying means including:
      a back light;
      a liquid crystal board disposed over the back light for displaying data in cooperation with the back light; and
      a Fresnel lens disposed on the liquid crystal board for deflecting light passing through the liquid crystal board in a desired direction; and
   (b) means, disposed on the displaying means in tandem, for entering operation instructions in accordance with the operation information displayed on the displaying means and entering the information related to the original.

4. An apparatus for displaying and entering operation instructions and image information related to an original, comprising:
   (a) means for displaying operation information at predetermined coordinates, the displaying means having a surface for supporting the original thereon; and
   (b) means, disposed on the displaying means in tandem, for entering operation instructions in accordance with operation information displayed on the displaying means and entering the information related to the original;
   the entering means comprising:
      a transparent glass board;
      a broad transparent electric sheet covering all of the transparent glass board;
      spacers disposed at regular intervals on the broad transparent electrode sheet in -x- and -y- directions;
      a transparent film;
      a number of electrode pats attached to the transparent film and disposed within the spaces enclosed by the spacers; and
      a glare-prevention coat formed on the transparent film.

5. An apparatus for displaying and entering operation instructions and image formation related to an original comprising:
   (a) a touch panel means for displaying operation information at predetermined coordinates, the displaying means having a surface for supporting the original thereon;
   (b) means, disposed on said displaying means in tandem, for entering operation instructions in accordance with operation information displayed on said displaying means and entering the information related to the original; and
   (c) a Fresnel lens attached to the lower surface of the touch panel.

6. An apparatus for displaying and entering operation instructions and image information related to an original, comprising:
   (a) means for displaying operation information at predetermined coordinates, the displaying means having a surface for supporting the original thereon; and
   (b) means, disposed on said displaying means in tandem, for entering operation instructions in accordance with operation information displayed on said displaying means and entering the information related to the original, the entering means being opened or closed relative to the displaying means by at least one hinge, to allow sandwiching of the original between the entering means and the displaying means.

7. An apparatus for displaying and entering operation instructions and image formation related to an original, comprising:
   (a) means for displaying operation information at predetermined coordinates, the displaying means having a surface for supporting the original thereon;
   (b) means, disposed on said displaying means in tandem, for entering operation instructions in accordance with the operation information displayed on the displaying means and entering the information related to the original; and
   (c) a sensor disposed in the entering means for detecting image information related to the original, so that, when the sensor detects the presence of the original, any desired rectangular image area can be determined by touching the surface of the entering means at two diagonally opposing points.

8. The apparatus as set forth in claim 7, wherein the displaying means is restricted to a smaller area than that covered by a maximum-size original.

9. The apparatus as set forth in claim 6, wherein the hinge is attached to a rod vertically slidable relative to the displaying means, to allow a thick original to be sandwiched between the entering means and the displaying means.

10. An apparatus for displaying and entering operation instructions and image information related to an original, comprising:
   (a) means for displaying operation information at predetermined coordinates, the displaying means having a surface for supporting the original thereon; and
   (b) means, disposed on the displaying means in tandem, for entering operation instructions in accordance with operation information displayed on the displaying means and entering the information related to the original, the entering means including a transparent switching member for designating a position where the operation information is displayed by touching the surface thereof.

11. An apparatus for displaying and entering operation instructions and image information related to an original, comprising:
   (a) means for displaying operation information at predetermined coordinates, the displaying means having a surface for supporting the original thereon, the displaying means further including:
      a display panel having a plurality of dot-matrix display segments; and
      a driver, connected to the dot-matrix display segments, for activating the display segments; and
   (b) means, disposed on the displaying means in tandem, for entering operation instructions in accordance with the operation information displayed on the displaying means and entering the information related to the original.

* * * * *